United States Patent [19]
McLoughlin et al.

[11] 4,224,826
[45] Sep. 30, 1980

[54] FLOW MEASURING MEANS

[75] Inventors: John McLoughlin, 92 Mobrey La., Smithtown, N.Y. 11787; Neocles Athanasiades, Setauket; Yehuda Rotblum, Lake Grove, both of N.Y.

[73] Assignee: John McLoughlin, Smithtown, N.Y.

[21] Appl. No.: 1,149

[22] Filed: Jan. 5, 1979

[51] Int. Cl.³ .......................... G01F 15/00; F15D 1/04
[52] U.S. Cl. ......................................... 73/198; 138/37
[58] Field of Search ................ 73/194 R, 198, 205 L, 73/212, 213; 138/37

[56] References Cited
U.S. PATENT DOCUMENTS

| 1,090,100 | 3/1914 | Englesson | 138/37 |
| 1,759,239 | 5/1930 | Morrison | 73/205 |
| 3,374,673 | 3/1968 | Trageser | 73/213 |
| 3,733,898 | 5/1973 | Yamamoto | 73/205 |
| 3,945,402 | 3/1976 | Murphy | 138/37 |
| 4,130,017 | 12/1978 | Benedict | 73/211 |
| 4,142,413 | 3/1979 | Bellinga | 73/198 |

Primary Examiner—Herbert Goldstein
Attorney, Agent, or Firm—James P. Malone

[57] ABSTRACT

Flow measuring means in a pipe having turbulent flow. A chamber is inserted in the pipe. The chamber having a diameter substantially larger than the diameter of the pipe. A flow meter is mounted in the pipe downstream from the chamber. The chamber substantially reduces turbulence in the pipe and provides a reliable flow measurement.

3 Claims, 5 Drawing Figures

FLOW MEASURING MEANS

This invention relates to liquid flow means and more particularly to means for measuring flow in a pipe having turbulent flow conditions.

It is necessary to measure liquid flow in many cases, for instance, in fire truck pumping equipment. In fire trucks the space is cramped and there are no long lengths of straight pipe. On the contrary, there are many pipe bends and valves crowded into a small space, these conditions make the liquid flow turbulent within the pipes.

The present invention inserts a chamber or plenum in the pipe which tends to substantially remove the turbulence and a liquid flow meter is inserted in the pipe downstream from the chamber where the flow is not turbulent. The chamber has a diameter larger than the diameter of the pipe.

Accordingly, a principal object of the invention is to provide new and improved liquid flow measuring means.

Another object of the invention is to provide new and improved liquid flow measuring means in cramped spaces having bends and valves which cause turbulent flow.

Another object of the invention is to provide new and improved flow measuring means for measuring liquid flow in a pipe having turbulent flow comprising, a chamber inserted in the pipe, a chamber having a diameter substantially larger than the diameter of the pipe, and a flow meter mounted in the pipe downstream from the chamber, whereby the chamber substantially reduces turbulence in the pipe and provides a reliable flow measurement.

These and other objects of the invention will be apparent from the following specification and drawings of which:

Figure 1:
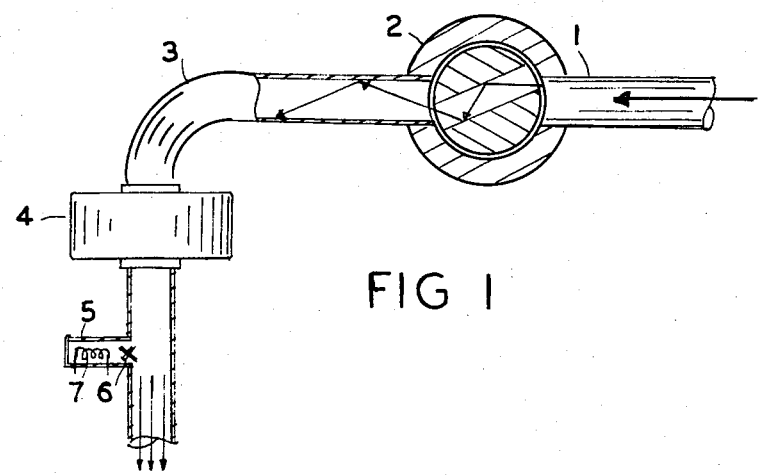
FIG. 1 is a side view partly in section of an embodiment of the invention.

Referring to the figures, FIG. 1 shows a typical arrangement of the pipe 1, connected to a water source which feeds water through the quarter turn valve 2, to the pipe 3. As shown in FIG. 1, when the quarter turn valve is not fully opened, the flow bounces off the side of the pipe 3 and is quite turbulent. The turbulence is substantially removed by inserting a chamber 4 in pipe 3 and then inserting a flow meter 5 downstream from the chamber. The flow meter may be of the type which has a paddle 6 having magnets which is rotated by the flow. The coil 7 picks up electrical pulses from the rotating magnets and the pulse rate is proportional to the rate of flow. In a typical installation, if the pipe 3 is 2½ inches in diameter then the chamber 4 would preferably be about four inches in diameter and the length of the chamber along the axis of the pipe is in the neighborhood of two pipe diameters. The insertion of the chamber or plenum in the pipe permits the turbulence to subside and provides a relatively smooth flow at the point where the flow meter 5 measures the flow.

Figure 2:
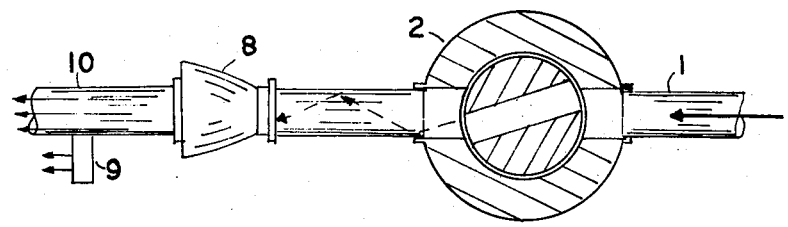
FIGS. 2 to 5 are side views partly in section of other embodiments of the invention.

FIG. 2 shows another embodiment of the invention wherein the chamber 8 is a bell shape and the flow meter 9 is inserted in the pipe 10 downstream from the chamber 8. The chamber has threaded ends so that they can easily be screwed onto the pipes. The bell chamber 8 of FIG. 2 may be a standard plumbing part which is readily available.

Figure 3:
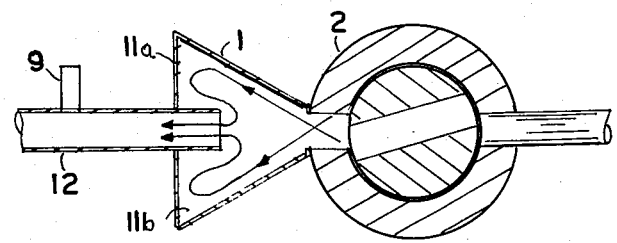

FIG. 3 shows another embodiment of the invention wherein the turbulence reducing chamber 11 has the out pipe 12 extending substantially into the triangular cross-section chamber. In this arrangement, turbulent water is caught in the traps 11a, 11b and reversed.

There is no restriction for large flows from a fully opened valve 2 since that flow will be directed in line with the out pipe.

Figure 4:
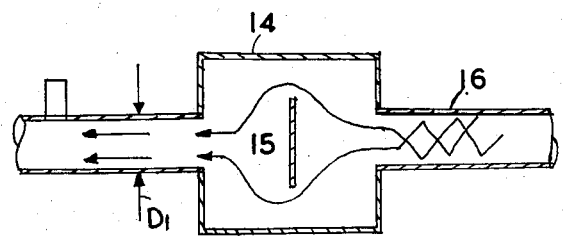

FIG. 4 shows another embodiment of the invention wherein the turbulence reducing chamber 14 has a circular solid plate 15 mounted in its central portion. The diameter of the circular plate is substantially equal to the $D_1$ of the pipe 16 having the turbulent flow.

Figure 5:
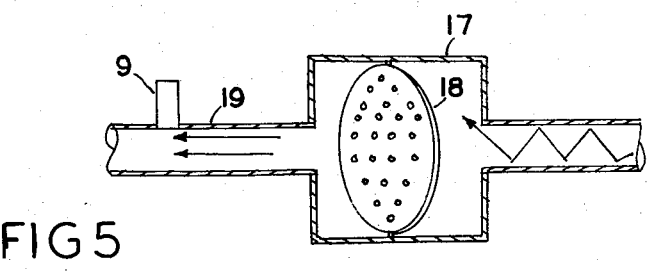

FIG. 5 shows another embodiment of the invention wherein the chamber 17 has a perforated baffle plate 18 having a diameter larger than the diameter of the pipe 18 which is supplying the turbulent flow.

Therefore, the present invention provides simple and inexpensive means for obtaining reliable flow means within cramped space where the flow is likely to be turbulent.

The invention is advantageous for fire truck installation where the space is cramped and where reliable readings of the flow to hoses is necessary.

It is claimed:

1. Means for measuring liquid flow in a pipe having turbulent flow comprising:
   a chamber inserted in the pipe,
   a chamber having a diameter substantially larger than the diameter of the pipe, and
   a flow meter mounted in the pipe downstream from the chamber,
   the chamber being substantially triangular and the downstream pipe extends into the chamber,
   whereby the chamber substantially reduces turbulence in the pipe and provides a reliable flow measurement.

2. Apparatus as in claim 1 having a baffle plate mounted in the central portion of the chamber.

3. Apparatus as in claim 2 wherein the baffle plate is perforated.

* * * * *